Patented Aug. 16, 1932

1,872,320

UNITED STATES PATENT OFFICE

EMIL MINO, OF ALBANY, AND JAMES McCANN AND MICHAEL FISCHER, OF RICHMOND, CALIFORNIA, AND THOMAS D. RADCLIFFE, OF BROOKVILLE, PENNSYLVANIA, ASSIGNORS TO STANDARD OIL COMPANY OF CALIFORNIA, OF SAN FRANCISCO, CALIFORNIA, A CORPORATION OF DELAWARE

ARC WELDING ELECTRODE

No Drawing.     Application filed March 2, 1929.   Serial No. 343,919½.

This invention relates to the deposition of metals by means of an electric arc whereby the metal to be deposited is fused in contact with a metallic surface in order to build up such surface or to join two metallic surfaces together by welding. The invention particularly relates to a welding electrode capable of being handled, stored and shipped without alteration or damage and capable of being used in the electro-deposition of metals by means of the electric arc without change in the character of the metal being deposited. The invention also relates to a method of forming coated electrodes capable of forming a protective atmosphere around the top or fused end of the electrode, thereby preventing oxidation of metal being deposited.

In arc welding a metal electrode is fused or volatilized by an electric arc formed between the work and the electrode, the molten or volatilized metal from which the electrode is formed flowing from the electrode, onto the work.

It is well known that contact with air at the high temperatures prevailing in an electric welding operation results in oxidation of the fused metals, with the tendency to form gaseous or inert compounds which increase the porosity and affect the homogeneity of the metal being deposited.

It has been found that the fused metal from electrodes of this character changes in character due to the action of atmospheric air so that the deposited metal loses the qualities originally imparted to the electrodes. In this manner, the character of the metal actually deposited in a weld may be materially changed from that inherent in the metal while it was in the form of an electrode. This alteration in the qualities of the metal of the electrodes during an arc welding results in welds of inferior quality.

In order to overcome these disadvantages attempts have been made to use electrodes covered with material which decomposes or disintegrates as the electrodes are consumed so as to form a non-oxidizing or protective atmosphere around the work, preventing access of air to the molten metal and tending to hold the heat generated by the electric arc. Although many different coatings have been described, these coatings generally consist of porous fabric impregnated with heat resisting substances. For example, cotton or asbestos cord has been wound around the electrodes then dipped in saturated solutions of sodium silicate or the like and then dried.

It was believed that such coatings improved the quality of the work and protected the metal being deposited by forming craters at the tips of the electrodes, the wrappings of asbestos and the like being more heat resistant and thereby disintegrating at a slightly lower rate than the metal of the electrode itself.

Many variations in the composition of the electrode coatings as hereinabove described have been used, such coatings being generally applied in the form of solutions or aqueous pastes built up in single and multiple layers and requiring that the electrodes be baked or otherwise dried before being used. These methods, previously disclosed, are cumbersome, slow and expensive and result in more or less uneven distribution of the heat resistant material. It has been found that the deposition of silicates and the like from solution or in the form of plastic pastes produces a porous crystalline structure which obviously cannot provide a coating capable of efficiently producing an oxygen-free atmosphere. Furthermore, the spiral wrappings of asbestos cord and the like are capable of absorbing only limited quantities of aqueous heat resistant solutions and easily become separated from or disarranged upon the surface of the electrodes, being but weakly held in place by frictional engagement with the surface of the electrode. Furthermore, the expansion of the coils of asbestos or cotton under the action of the heat during welding tends to separate such coils from contact with the surface of the electrode before the proper time and thus the efficiency of the coating is very materially reduced.

An object of the present invention is to disclose and provide a method of coating electrodes with a single application of a material capable of supplying a non-oxidizing vapor to surround the work and at the same time forming a protective covering for the deposited metal. Another object is to provide a method of producing coated electrodes in a simple and inexpensive manner.

Another object of this invention is to provide a method of applying a fused coating to metallic electrodes, which coating is non-absorbent, moisture proof and tenaciously clings to the electrodes.

An object of this invention is to provide an electrode or welding rod containing constituents capable of combining with the fused metal to improve the character and strength of the deposited metal. Another object is to provide a welding electrode with a covering which tends to form a protective slag or coating over the metal deposited during welding. Another object is to provide an electrode coated with a material capable of forming a non-oxidizing gas which surrounds the arc and metal during deposition thereof and prevents access of air to the work.

Other objects and advantages of our invention will appear from the following detailed description.

In brief, the invention comprises the application of a fused flux or slag to electrodes of suitable composition and the process of forming such electrodes may be carried out by dipping the metallic electrodes in a molten bath of the coating material. The electrodes may be preheated to a temperature approximating that of the molten bath before dipping therein or they may be dipped cold and allowed to remain in the molten bath until heated thereby, thus insuring a close, tenacious bond between the electrode and the coating.

By this method a single application of the coating to the electrodes results in a dense homogeneous covering which requires no baking or drying and allows the coated electrode to be used at once.

A further advantage is that no extensive apparatus is necessary in making up the coated electrodes embraced by this invention and the method may be carried out at little expense and without the aid of skilled labor. The time required to coat electrodes in this manner is extremely short and thus contrasts greatly with the previous tedious process of wrapping a cotton or asbestos cord closely around a welding rod. The thickness of the final coating applied in the above described manner can be predetermined by the temperature of the fixed flux and its composition. The character of the coating, such as its acidity or basic characteristics may be varied at will by changing the constituents of the flux.

The coating obtained by us is smooth, dense, and hard, having the appearance of a glaze closely and tenaciously adhering to the metallic electrode. A coating of this character does not absorb moisture and the electrodes coated therewith are capable of being handled and stored without deterioration.

The invention may be more fully understood by a description of a particular coating made up and applied to an electrode for welding chromium iron alloys. In making electrodes for this purpose the following ingredients may be thoroughly mixed together and fused in a pot at a temperature of about 2200° F.:

| | Parts by weight |
|---|---|
| Boric acid in crystal form | 4 |
| Borax glass | 2 |
| Red iron oxide | 1 |

The above ingredients may be fused in a pot made of any suitable material, welded or cast chromium alloys having been found satisfactory for the purpose. The fused flux may be applied to the electrode from the melting pot or it may be transferred to a separate dipping kettle provided with means for maintaining the contents thereof at a temperature of from about 1800 to 2200° F.

The metallic electrodes to be coated by the method herein described should preferably have a comparatively rough surface such as results from hot finishing rather than the smooth surface which results from cold drawing. It will be understood that the rods may be of any suitable metal or alloy consistent with the character of the surface to be welded and the nature of the results desired.

The metallic rods from which the electrodes are to be made may be preheated in a separate oven or furnace to a temperature approximating that of the molten flux, for example to a temperature of about 1800° F., and while at that temperature may be dipped vertically into the hot bath of the molten flux and held therein a sufficient length of time to attain the temperature of the flux (1800 to 2200° F.). Means may be provided for maintaining the temperature of the molten bath at the required temperature. The preheating of the rods is economically desirable although it may be avoided by dipping cold metallic electrodes into the molten bath and allowing them to remain in the bath for a longer period.

After the rods have remained in the molten bath for a sufficient length of time they may be slowly withdrawn, still in a vertical position, and allowed to drip or drain so as to remove the superfluous flux adhering thereto. The tips of the electrodes may be wiped off or later treated so as to expose the metallic rod at the working tips. The working tip may be coated with substances capable of volatilizing at relatively low temperatures so as to facilitate striking an arc when starting to deposit the metal of the rod during arc welding. As has been said before, the coatings obtained in this manner will be found to be smooth, of uniform thickness and of a dense, vitreous structure, free from cracks or blow holes.

As an alternative method of securing the coated electrodes herein described, well known commercial processes of glazing or enameling may be employed, in which the fusible material is applied to the electrodes in powdered or paste form and then fired in a suitable furnace to maturity. In carrying out this alternative method, the metallic electrodes may be first heated so as to insure the adherence of a powdered flux thereto or the flux may be combined with a suitable binder and applied to the cold electrodes in the form of a paste. The glaze may then be fused on the surfaces of the metallic rods by means of external heat in a furnace or an electric current may be passed through the electrodes to secure the necessary fusion temperatures by internal heat.

In aiddtion to the specific composition disclosed hereinabove, many other materials have been used for making the flux and various combinations of borax, sodium carbonate, ferrous carbonate, calcium silicate and the like have given satisfactory results. A wide variety of compositions may be used and the ingredients may be changed within wide ranges depending upon the particular requirements of the work at hand, but it is desirable that certain constituents such as infusible materials, carbon and other elements detrimental to steel or the material being welded are avoided. Metals beneficial to the deposit, such as nickel, manganese, steel or titanium may be added and iron, preferably in the form of red iron oxide, may be added to toughen the coating and keep it from spalling and crazing.

It has been found that electrodes made up in accordance with this invention give highly satisfactory results in ordinary welding and are particularly adapted to the welding of high chromium steel, chromium nickel, alloys and the like, where difficulties have been experienced in the past in depositing the welding metal without change in its original characteristics.

During the process of electric welding with the coated electrodes made in accordance with this invention, a gas is produced which tends to enclose the work in an envelope of non-oxidizing gas. There is no tendency for the molten metal to boil or otherwise reduce the density of the deposit and the finished work is smooth and homogeneous, a protective surface coating of slag being formed as the work progresses. The function of this slag is to prevent oxidation of a metal while in a highly heated condition and such slag may be later removed from the work after cooling.

The invention is not to be limited to the particular composition of coating or glaze specifically mentioned herein or the method described in detail hereinabove, but includes numerous changes and modifications coming within the scope of the following claim. For example, although the particular illustration given herein relates to a welding electrode adapted for welding chromium iron alloys, similar fused flux coatings may be applied to rods of various other compositions, such as bronze, chromium, chromium nickel, manganese steel and high carbon steel, depending on the properties of the metals being welded and the character of the desired deposition.

We claim:

An electrode for use in arc welding comprising, a metallic rod covered with a fused coating of approximately the following proportions, boric acid (crystalline) 4 parts, borax glass 2 parts, red iron oxide 1 part.

Signed at Richmond, Calif., this 7th day of January, 1929.

EMIL MINO.
JAMES McCANN.
MICHAEL FISCHER.

Signed at Milwaukee, Wis., this 13th day of February, 1929.

THOMAS D. RADCLIFFE.